US012173550B2

(12) United States Patent
Subramanian et al.

(10) Patent No.: US 12,173,550 B2
(45) Date of Patent: Dec. 24, 2024

(54) LAVATORY DOORS USING TOUCHLESS ACTUATION AND DE-ACTUATION MECHANISM

(71) Applicant: B/E Aerospace, Inc., Winston Salem, NC (US)

(72) Inventors: Sanith Kurumpilavu Subramanian, Chikkabanavara (IN); Dharamveer Surya Prakash Bathla, Sonepat (IN); Vishwanand Vishwannathan, Bangalore (IN)

(73) Assignee: B/E AEROSPACE, INC., Winston Salem, NC (US)

( * ) Notice: Subject to any disclaimer, the term of this patent is extended or adjusted under 35 U.S.C. 154(b) by 509 days.

(21) Appl. No.: 17/327,557

(22) Filed: May 21, 2021

(65) Prior Publication Data

US 2021/0363811 A1 Nov. 25, 2021

Related U.S. Application Data

(60) Provisional application No. 63/029,206, filed on May 22, 2020.

(51) Int. Cl.
*E05F 15/73* (2015.01)
*E05B 47/00* (2006.01)
(Continued)

(52) U.S. Cl.
CPC .......... *E05F 15/73* (2015.01); *E05B 47/0012* (2013.01); *E05B 53/001* (2013.01);
(Continued)

(58) Field of Classification Search
CPC ......... E05F 15/73; E05F 5/40; E05F 2015/76; E05B 47/0012; E05B 53/001; E05C 9/041; E05Y 2900/132
See application file for complete search history.

(56) References Cited

U.S. PATENT DOCUMENTS 3,012,837 A 12/1961 Morrissey, Jr.
4,994,722 A * 2/1991 Dolan ..................... E05B 47/00
340/565

(Continued)

FOREIGN PATENT DOCUMENTS

CA 2627110 A1 10/2009
CN 109162529 A 1/2019
(Continued)

OTHER PUBLICATIONS

Extended European Search Report for European Patent Application No. EP21175699.4, dated Nov. 2, 2021.
(Continued)

*Primary Examiner* — Mark A Williams
(74) *Attorney, Agent, or Firm* — SNELL & WILMER L.L.P.

(57) ABSTRACT

A system comprises a door including a latch assembly configured to latch the door to a doorframe in a closed position of the door. An latch actuator is operatively connected to the latch assembly to drive the latch assembly to latch and unlatch the door. A exterior touchless sensor operatively connected to the actuator to cause the actuator to unlatch the latch assembly upon receipt of touchless input from a user.

13 Claims, 9 Drawing Sheets

(51) Int. Cl.
   *E05B 53/00* (2006.01)
   *E05C 9/04* (2006.01)
   *E05F 15/40* (2015.01)

(52) U.S. Cl.
   CPC .............. *E05C 9/041* (2013.01); *E05F 15/40* (2015.01); *E05F 2015/765* (2015.01); *E05Y 2900/132* (2013.01)

(56) References Cited

U.S. PATENT DOCUMENTS

| | | | |
|---|---|---|---|
| 6,891,479 B1* | 5/2005 | Eccleston | E05F 15/63 340/545.1 |
| 6,967,587 B2* | 11/2005 | Snell | E05F 15/73 340/925 |
| 8,141,296 B2* | 3/2012 | Bem | E05B 65/0035 49/340 |
| 8,225,458 B1* | 7/2012 | Hoffberg | E05F 15/73 16/84 |
| 8,720,827 B2 | 5/2014 | Boren | |
| 8,888,045 B2 | 11/2014 | Boren et al. | |
| 8,994,229 B2* | 3/2015 | Blair | H03K 17/94 340/545.1 |
| 9,045,231 B2 | 6/2015 | Swain | |
| 9,447,625 B1 | 9/2016 | Seebaransingh et al. | |
| 9,574,374 B2* | 2/2017 | Klevens | E05B 65/0035 |
| 2010/0253516 A1* | 10/2010 | Lemerand | E05F 15/73 340/545.1 |
| 2012/0119521 A1 | 5/2012 | Lehr | |
| 2014/0020437 A1* | 1/2014 | Bliding | G07C 9/00309 70/283.1 |
| 2014/0196372 A1* | 7/2014 | Boren | E05F 15/73 49/31 |
| 2014/0267739 A1 | 9/2014 | Ibsies | |
| 2015/0308178 A1* | 10/2015 | Warren | E05F 15/73 700/275 |
| 2018/0016836 A1* | 1/2018 | Ibsies | H04N 7/188 |
| 2018/0209203 A1* | 7/2018 | Shen | E05F 15/77 |
| 2018/0320412 A1* | 11/2018 | Matosian | E05B 49/00 |
| 2018/0340350 A1* | 11/2018 | Johnson | G07C 9/00944 |
| 2019/0128022 A1 | 5/2019 | Markway | |
| 2020/0164988 A1 | 5/2020 | Alvarez | |

FOREIGN PATENT DOCUMENTS

| | | |
|---|---|---|
| CN | 1101168179 | 4/2021 |
| DE | 29807422 U1 | 1/1999 |
| DE | 20104967 U1 | 6/2001 |
| DE | 10119978 A1 | 12/2001 |
| DE | 102014105565 A1 | 10/2015 |
| EP | 1378622 A2 | 1/2004 |
| FR | 1951487 | 4/2011 |

OTHER PUBLICATIONS

Extended European Search Report for European Patent Application No. EP21175777.8, dated Nov. 10, 2021.

* cited by examiner

LAVATORY DOORS USING TOUCHLESS ACTUATION AND DE-ACTUATION MECHANISM

CROSS-REFERENCE TO RELATED APPLICATIONS

This application claims priority to and the benefit of U.S. Provisional Patent Application No. 63/029,206 filed May 22, 2020, the entire content of which is incorporated herein by reference in its entirety.

BACKGROUND

1. Field

The present disclosure relates generally to aircraft interiors, and more particularly to doors for aircraft interiors and the like.

2. Description of Related Art

Lavatory systems must include certain features to be compliant for certification, for example, the lavatory must offer a certain amount of privacy and be accessible to all users including those in wheelchairs. Conventional lavatory systems include a series of foldable doors, each having a door lock and latch assembly, which allows the occupant to lock the door. However, requiring the door lock and latch assembly to be operated by hand can create a high touch point surface, which can transmit pathogens from one user to another, creating a safety and health concern to users of the lavatory system.

The conventional techniques have been considered satisfactory for their intended purpose. However, there is an ever present need for improved systems and methods for touch free operation of lavatory door systems. This disclosure provides a solution for this need.

SUMMARY

A system comprises a door including a latch assembly configured to latch the door to a doorframe in a closed position of the door. An latch actuator is operatively connected to the latch assembly to drive the latch assembly to latch and unlatch the door. A exterior touchless sensor operatively connected to the actuator to cause the actuator to unlatch the latch assembly upon receipt of touchless input from a user.

The doorframe includes a set of hinges connecting the door to the door frame allowing the door to move between the closed position and an open position. A biasing member connects the door to the doorframe and biasing the door into the closed position relative to the door frame. A controller is operatively connected to the touchless sensor and to the actuator to control the actuator based on input from the exterior senor. An interior sensor is operatively connected to the controller to provide input to the controller based on an occupant inside the door. The controller can include machine readable instructions stored in operative communication with the controller to cause the controller to at least actuate the latch actuator to unlatch the door upon receipt of user input to the exterior touchless sensor if the interior sensor provides input indicative of no occupant inside the door and actuate the latch actuator to unlatch the door upon receipt of user input to the interior sensor.

In certain embodiments, the machine readable instructions further include instructions configured to cause the controller to at least: interpret a gesture by the user when the gesture is performed in view of the sensor; and actuate the latch actuator upon the gesture based on a predetermined action assigned for the gesture. In certain embodiments, the machine readable instructions can be configured to cause the controller to perform a method, the method including: actuating the latch actuator to unlatch the door and actuating an extendible door actuator moving the door to an open position, holding the door in the open position for a threshold amount of time, sensing, after the threshold amount of time, if an obstruction is present in the door frame; and if no obstruction is present in the door frame, releasing the door from the open position and actuating the extendible door actuator moving the door to the closed position, and actuating the latch actuator to latch the door; or if an obstruction is present in the door frame, maintaining the door in the open position until the obstruction is no longer present.

The exterior sensor can be disposed on an exterior of the door, adjacent the door frame and the interior sensor is disposed on an interior of the door, adjacent the door frame. At least one removable access panel can be the door positioned for at least one of: servicing the latch assembly and/or the touchless sensor; and/or for an emergency opening of the door. In embodiments, the door can include a pair of door panels hingedly connected to one another along a hinge line, where at least one door panel includes at least one protrusion configured to seat and slide within a track of the door frame.

An extendible actuator operatively connects between a door panel of the door and the door frame such that actuation of the extendible actuator moves the door between an open position and a closed position. In embodiments, the extendible actuator can be operatively connected to a controller. In certain embodiments, a display panel can be operatively connected to the controller, the display panel configured to indicate occupancy status. Occupancy status can include at least one of: occupied, vacant, and/or wait.

At least one of a microphone and/or speaker can be included on both an interior and exterior of the door for communication through the door when the door is in a closed position. The at least one of the microphone and/or speaker can be operatively connected to a controller, the controller is configured to actuate the latch actuator upon receipt of user input through the microphone and/or speaker. At least one additional sensor can be disposed on the doorframe and operatively connected to a controller configured to sense an obstruction in the doorframe.

A method comprises receiving input from a touchless sensor, actuating a latch actuator operatively connected to a latch assembly to drive the latch assembly to latch and unlatch a door based on the input from the touchless sensor, and actuating an extendible door actuator moving the door between an open and closed position.

The touchless sensor can be an exterior sensor operatively connected to a controller to provide input to the controller based on an occupant outside the door. In embodiments, the touchless sensor is an interior sensor operatively connected to a controller to provide input to the controller based on an occupant inside the door.

In certain embodiments, the touchless sensor can be an exterior sensor, where the method further includes querying if a user is proximate the exterior position sensor, and if a user is detected, waiting until the user performs a known gesture, if a known gesture is detected, actuating the latch actuator to unlatch the door and actuating the extendible door actuator moving the door to the open position, or if no known gesture is detected, waiting until the user performs a known gesture.

In certain embodiments, a position sensor can be disposed in a door frame, the method further comprising querying whether the user is in the door frame, if the user is detected in the door frame, holding the door in the open position and waiting a threshold period of time before issuing an alert to the user, or if no user is detected in the door frame, actuating the extendible door actuator moving the door to the closed position.

In certain embodiments, the touchless sensor can be a second touchless sensor, and can be an interior sensor, where the method further comprising querying if a user is proximate the interior position sensor, and if a user is detected, waiting until the user performs a known gesture, if a known close gesture is detected, actuating the extendible door actuator moving the door to the closed position and actuating the latch assembly to latch the door, or if a known open gesture is detected, actuating the latch actuator to unlatch the door and actuating the extendible door actuator moving the door to the open position, and if the door is latched, displaying on an external display panel a wait signal, or if no known gesture is detected, checking for presence of the user, and if after checking for presence of the user, no presence is detected, issuing an alert to the user for a threshold amount of time.

In embodiments, the method further includes, if after the threshold amount of time, presence of the user is detected, maintaining the door in the latched position, and taking no further action until a known open gesture is detected, or if after the threshold amount of time, presence of the user is not detected, issuing an alert to a third party.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, other embodiments thereof will be described in detail herein below with reference to certain figures, wherein.

DETAILED DESCRIPTION

Figure 1:
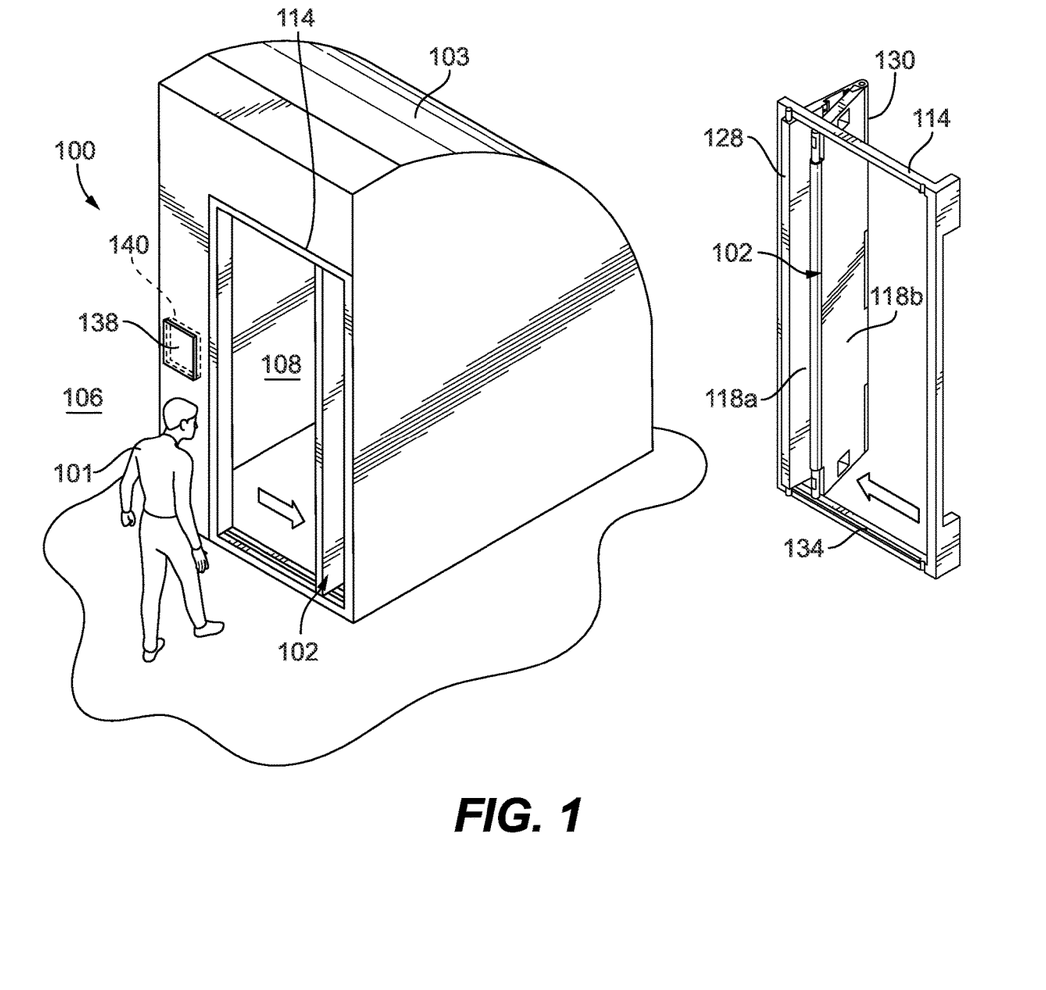
FIG. 1 is a schematic perspective view of an embodiment of a door system constructed in accordance with the present disclosure, showing a door moving between an open and closed position.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-9, as will be described. The systems and methods described herein can be used to improve.

Conventional lavatory door systems consists of at least one door panel, a set of hinges, a lock and/or latch assembly, at least one preloaded spring (if required), and status bar to indicate whether the lavatory is occupied. During normal operation, in order to access the lavatory, the door needs to be pushed at a portion marked "PUSH," or by using a lever assembly that is rotated to open the single door. Once inside the lavatory, the door system can be locked from inside by sliding a knob longitudinally, which can mechanically actuate a locking bar and maintaining the door in the locked position. If a preloaded spring is included, the spring biases the door in the open position, so that when the latch assembly is moved to the unlocked position, little force is required to open the door.

However, requiring the door lock and latch assembly to be operated by hand can create a high touch point surface, which can transmit pathogens from one user to another, creating a safety and health concern to users of the lavatory system. Provided herein is a door system 100 which includes a gesture sensor operated locking and unlocking assembly which can be readily retrofitted into the existing door unit with minor modifications. For example, the system 100 includes a touchless methodology which allows users to operate a door automatically based on the gesture specified (e.g. moving an arm in front the gesture sensor or holding the palm in front of the sensor a predetermined amount of time), as described herein below.

Referring now to FIG. 1, the door system 100 (e.g. for a lavatory 103) comprises a door 102, the door including a latch assembly 104 and the door defining an exterior space 106 and an interior space 108. The latch assembly 104 includes a latch actuator 110 and at least one latch member 112a, 112b. The latch actuator 110 is configured to move the at least one latch member 112a, 112b between a retracted and extended position, where the extended position is configured to latch the door 102 to a door frame 114, maintaining the door 102 in the closed position, and the retracted position is configured to unlatch the door 102 from the door frame 114 to allow the door to open to the opened position.

Figure 2:
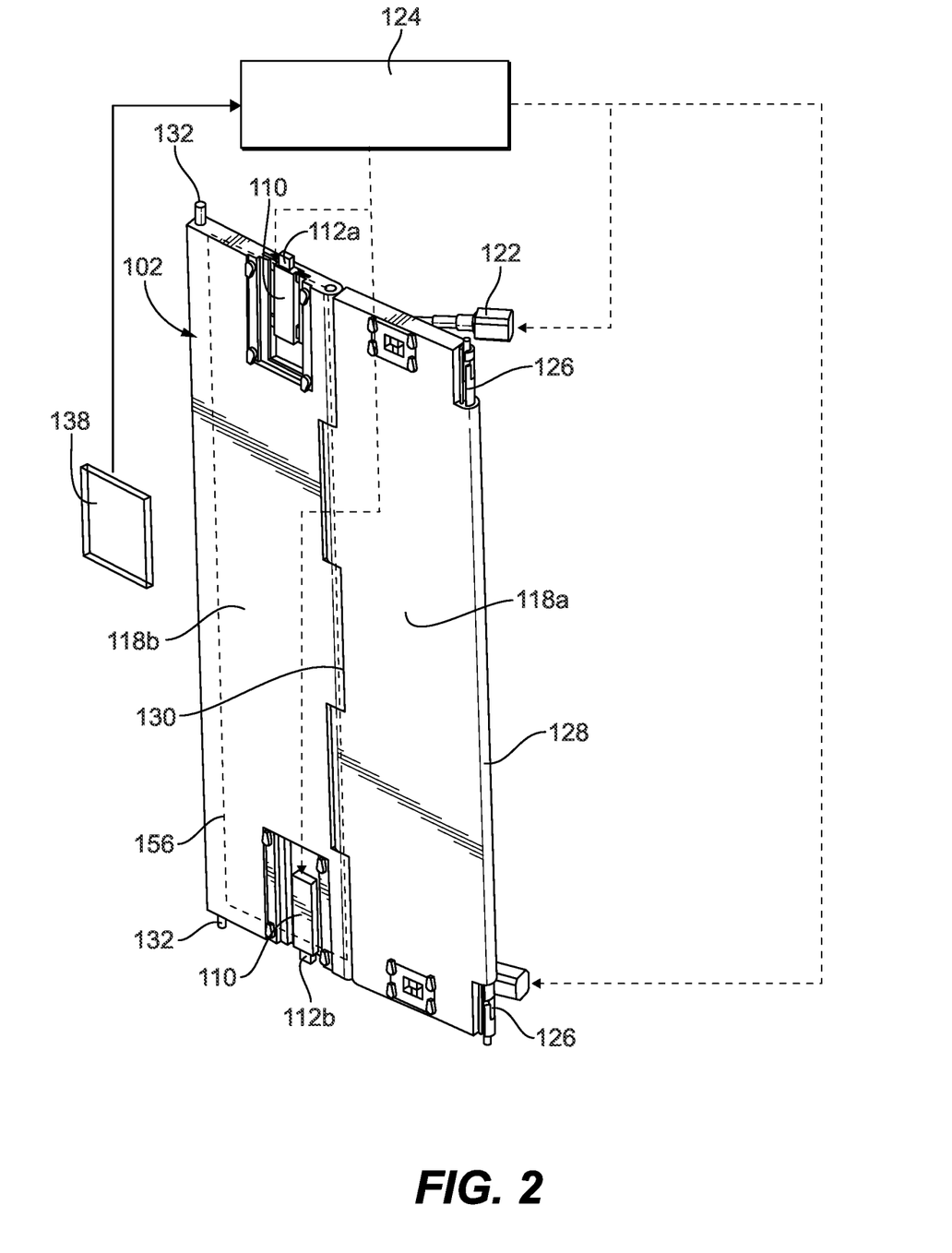
FIG. 2 is a schematic perspective view of the door system of FIG. 1, showing a latch assembly.
Figure 3:
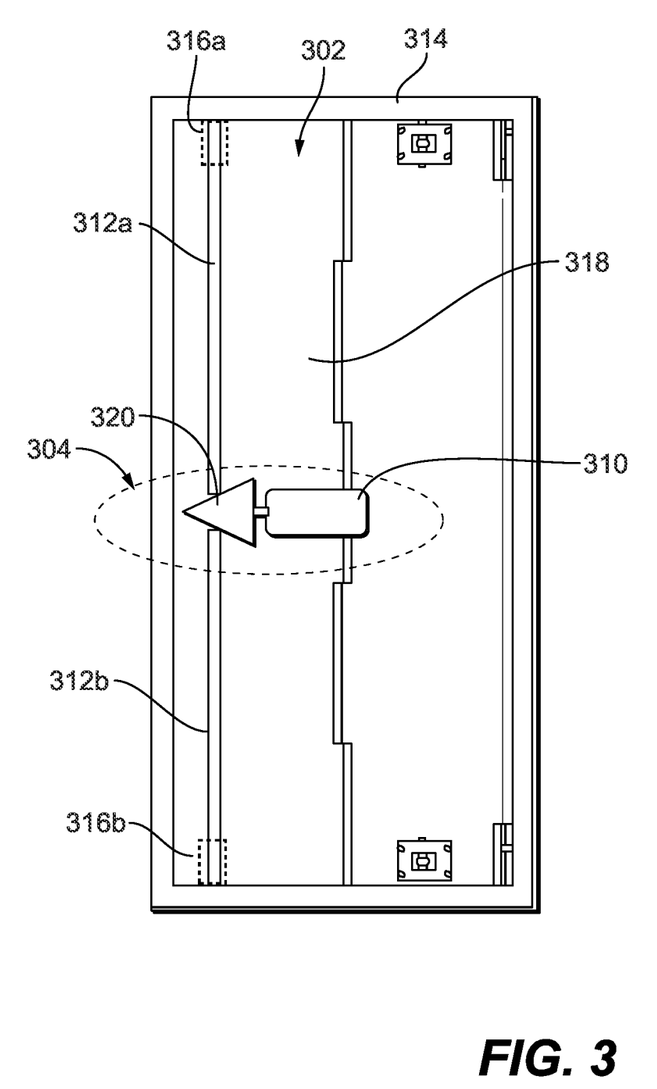
FIG. 3 is a schematic perspective view of the door system of FIG. 1, showing another latch assembly.

In certain embodiments, as shown in FIG. 2, the at least one latch member 112a, 112b includes the latch actuator 110, where the at least one latch member extends 112a, 112b and retracts according to the extension and retraction of the latch actuator. In certain embodiments, as shown in FIG. 3, the latch assembly 304 can include an upper and lower latch member 312a, 312b, each latch member 312a, 312b having a biasing compression spring 316a, 316b at an end of the door 302 adjacent the door frame 114, biasing the latch member 312a, 312b in the unlatched position. In this case, the latch actuator 310 can be disposed on a door panel 318 and can drive a wedge 320 between the upper and lower latch members 312a, 312b, forcing the latch members 312a, 312b into the latched position, against the force of the biasing compression spring 316a, 316b, maintaining the door 302 in the latched position.

An extendible actuator 122 operatively connects between the door panel 118 of the door and the door frame 114 such that actuation of the extendible actuator 122 moves the door 102 between the open position and the closed position. In embodiments, the extendible actuator 122 can be operatively connected to a controller 124, as described further below.

A set of hinges 126 operatively connects the door 102 to the door frame 114 along a first hinge line 128. In certain embodiments, the door 102 can include a pair of door panels 118a, 118b hingedly connected to one another along a second hinge line 130, parallel to the first hinge line 128. A least one door panel 118, 118b includes at least one protrusion 132 configured to seat and slide within a track 134 of the door frame 114. In embodiments, a biasing member (e.g. a helical or gas spring, or the weight of the extendible actuator 122 in the extended position) connects the door 102 to the doorframe 114, biasing the door 102 into the closed position relative to the door frame 114.

A exterior touchless sensor 138 operatively connects to the latch actuator 110 and extendible actuator 122 through the controller 124 to cause the latch actuator 110 to unlatch the latch member 112a, 112b upon receipt of touchless input from a user 101. The exterior sensor 138 can be disposed on the exterior 106 of the door 102, adjacent the door frame 114 and an interior sensor 140, the same or similar to the exterior sensor 138 is disposed on an interior 108 of the door 120, adjacent the door frame 114.

The controller 124 is operatively connected to the touchless sensors 138, 140 and to the latch actuator 110 and the extendible door actuator 122 to control movement of the actuators 110, 122 based on input from the touchless sensors 138, 140. For example, the controller 124 can be configured to actuate the latch actuator 110 and extendible door actuator 122 upon receipt of a gesture by user 101 on either of the exterior or interior sensors 138, 140, to hold the door 102 in the open position for a threshold amount of time, for example, until a close command is issued from the controller 124. The threshold amount of time can be a predetermined amount of time where the close command is automatically issued at the expiration of the threshold amount of time, or the threshold amount of time can include the amount of time for a user to clear the frame, as described below, or any suitable combination thereof can be used.

The controller 124 can include machine readable instructions stored in operative communication with the controller 124 to cause the controller to at least actuate the latch actuator 110 to unlatch the door upon receipt of user input to the exterior touchless sensor 138 if the interior sensor 140 provides input indicative of no user 101 inside the door 102 and actuate the latch actuator 110 to unlatch the door upon receipt of user input to the interior sensor 140.

Figure 4:
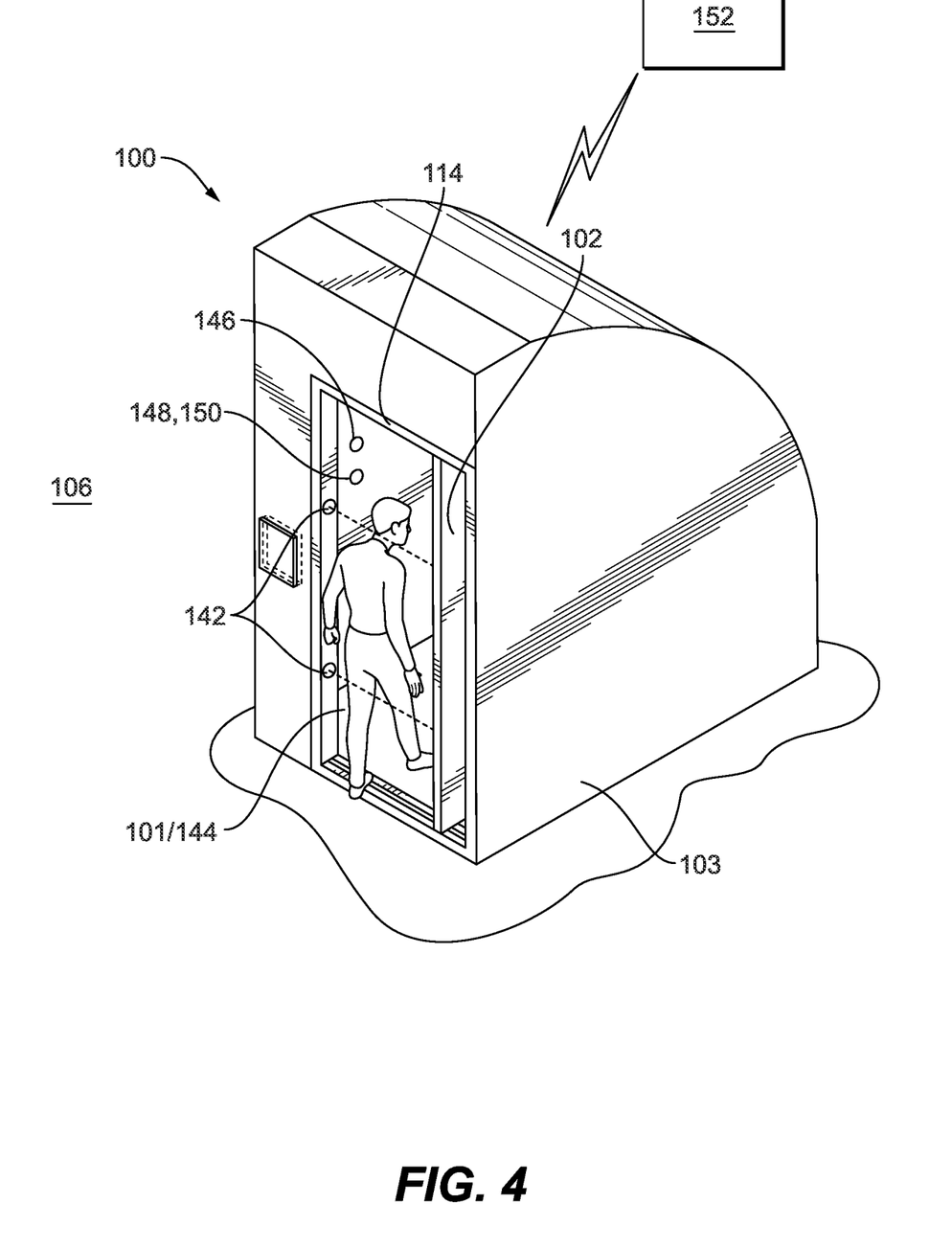
FIG. 4 is a schematic perspective view of the door system of FIG. 1, showing a user interacting with a sensor system of the door system.

In embodiments, such as in FIG. 4, at least one additional sensor 142 can be disposed on the doorframe 114 configured to sense an obstruction 144 in the doorframe 114. For example, the additional sensor 142 can scan the position of the user 101 while crossing the door frame 114, in order to avoid prematurely closing the door 102 while the user 101 is still crossing the frame 114. If no obstruction 144 is present in the door frame 114, the controller 124 can issue the close command and release the door 102 from the open position and actuating the latch actuator 110 the latch assembly 104 to retain the door in the latched position. If an obstruction 144 is present in the door frame 114, the controller 124 can maintain the door 102 in the open position until the obstruction 144 is no longer present, then after the obstruction 144 has cleared, release the door 102 from the open position and actuating the latch actuator 110 of the latch assembly 104 to retain the door 102 in the latched position.

The machine readable instructions further include instructions configured to cause the controller to at least: interpret a gesture by the user 101 when the gesture is performed in view of the sensor 138, 140; and actuate the latch actuator upon the gesture based on a predetermined action assigned for the gesture. For example a known gesture can be holding a hand in front of the sensor 138, 140 for a predetermined amount of time (e.g. about 5 seconds), where such a gesture can be assigned to the action unlatching/latching the door, and/or opening/closing the door, depending on the state of the door 102 when the gesture is performed. In this manner, the sensor 138, 140 can discriminate between known gestures and unknown, unassigned gestures. For example, an unknown, unassigned gesture could include, a user or crew walking past the sensor 138, 140, or a galley cart parked in front of the sensor 138, 140, or a small child playing with or near the sensor 138, 140.

In certain embodiments, interior sensors 146 may be included in the interior space 108 to monitor for health and safety concerns, or provide a manner for actuating the door 102 if the user 101 is unable to do so. For example, a microphone 148 and speaker 150 can be included to provide a means of communication between the user 101 and emergency services or crew on the exterior 106 of the door 102. In embodiments, the microphone 148 can be operatively connected to the controller 124 to actuate the latch actuator 110 to unlatch the doors 102 upon the user issuing a voice command, or other user input.

Figure 5:
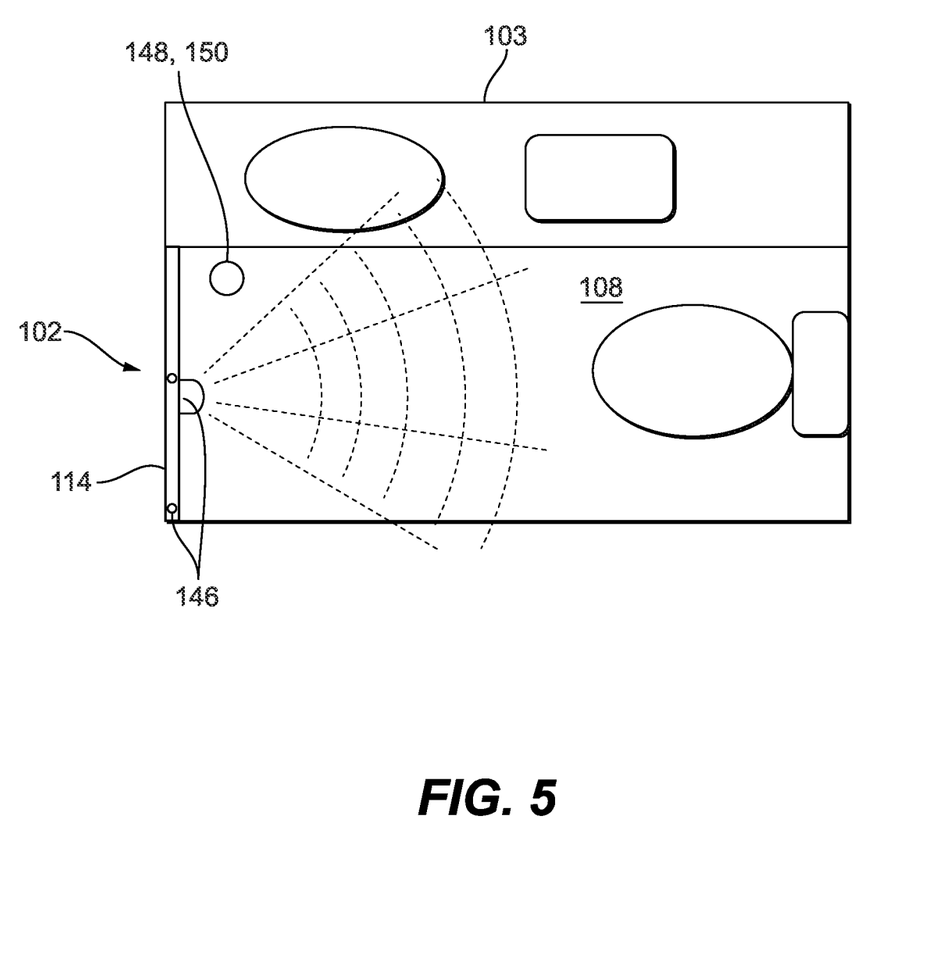
FIG. 5 is a schematic diagram of the sensor system of FIG. 4.

Referring now to FIG. 5, the interior sensors 146 can include sensors to detect presence and consciousness (e.g. passive infrared sensors and/or any proximity sensors). For example, the interior sensor 146 can be configured to scan the interior space 108 at chosen time intervals (e.g. every 10 seconds) to confirm the occupancy and the consciousness of the user 101. The interior sensors 146 can be operatively connected to a notification device 152 to communicate emergencies with crew, for example if the interior sensor 146 determines a user 101 is unconscious. In certain embodiments, if the interior sensor 146 scans for the movement of the user 101 continuously and if no movement is found, the microphone 148 and speaker 150 may be activated to alert the user 101. If the user 101 does not react to the command within a predetermined amount of time, (e.g. within 30 seconds), the microcontroller 124 can send a message to the notification device 152, instructing the crew to take action within a certain amount of time.

Figure 6:
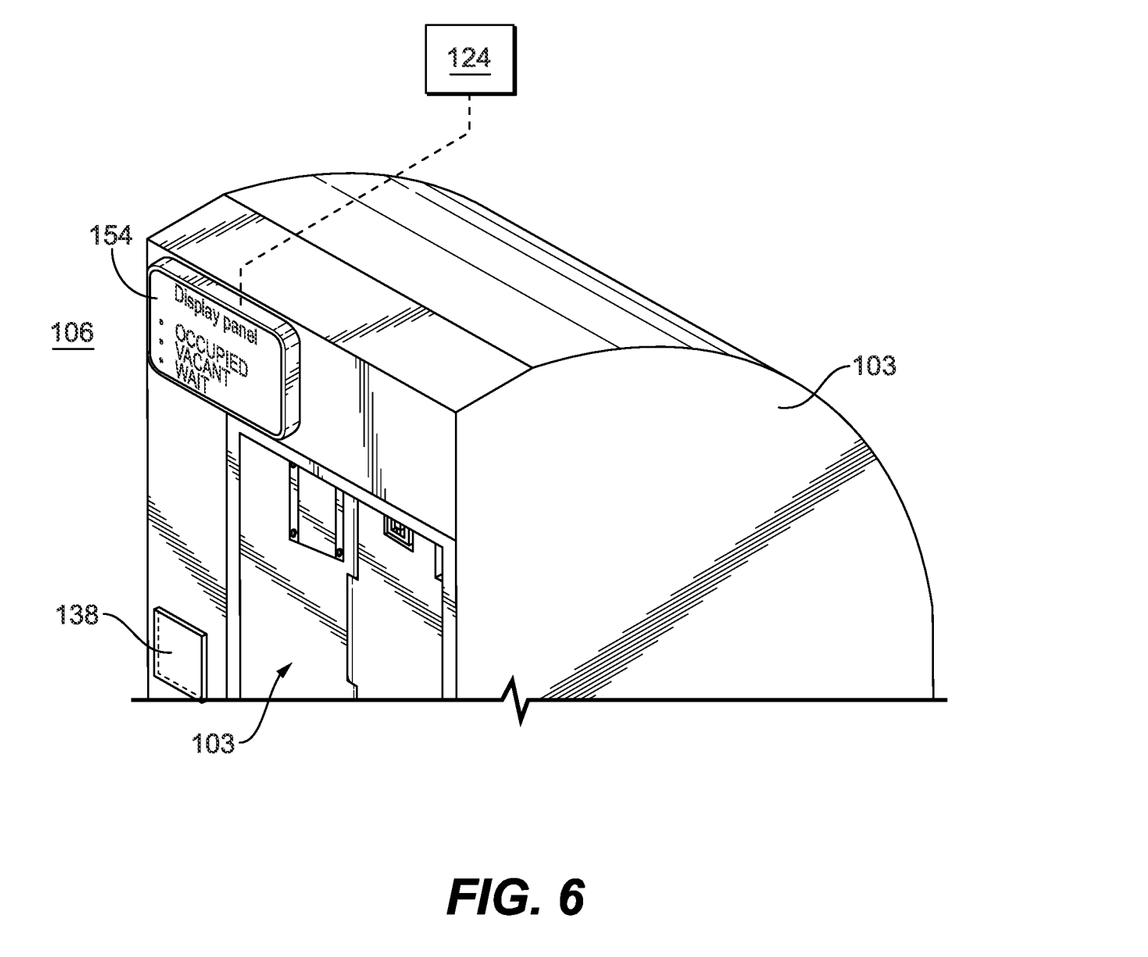
FIG. 6 is a partial schematic perspective view of the door system of FIG. 1, showing a display panel.

In certain embodiments, as shown in FIG. 6 a display panel 154 can be operatively connected to the controller 124, the display panel configured to indicate occupancy status. Occupancy status can include at least one of: occupied, vacant, and/or wait. For example, if the door 102 is closed and in the latched position, and the presence sensor 146 senses the presence of the user 101, the display panel 154 can indicate the lavatory 103 is occupied. If the door 102 is in the open position, or if the door 102 is in the closed position and unlatched, and the presence sensor 146 does not detect presence of a user 101, the display panel 154 can indicate the lavatory 103 is vacant. If the door 102 is in the closed position and unlatched, but the presence sensor 146 does sense the present of a user 101, the display panel can indicate "wait", alerting other users that the lavatory 103 may be occupied.

The presence sensor 146 can also continuously monitor the consciousness of the user 101 and to check occupancy. If the presence sensor 146 detects the presence of a user 101 it sends signals to controller 124 and the controller 124 performs a check to determine whether the door 102 is latched form inside. If the check fails, the speaker 150 can alert the user 101 to latch the door 102 (e.g. using sensor 140). If the user 101 does not react to the command within a predetermined amount of time (e.g. 20-25 seconds), the controller 124 can send a message crew (e.g. via notification device 152) to take an action within a predetermined amount of time, (e.g. 10-20 seconds). For example, the crew member could remotely latch the door 102 to maintain privacy for the user 101, then approach the respective lavatory 103 and interact with the user 101 using microphone 148 and speaker 150 to determine if the user 101 is in need of assistance. However, the controller 124 will not automatically latch the door 102 in spite of presence sensor data. Instead, the system 100 can be designed in such a way the system 100 will wait for the action from the crew member. Further, if a user forgets to latch the door 102 after occupying the lavatory 103, even though the system alerts the user 101, the controller will display on the display panel 154 simultaneously a "wait" message but the door 102 will still not be latched from inside, unless action from crew.

At least one removable access panel 156 can be the door 102 positioned for at least one of: servicing the latch assembly 104 and/or the touchless sensor 138, 140; and/or for an emergency opening of the door 102. At least one removable access panel 142 can be included on the door 102 (e.g. as shown in FIG. 2). The access panel 156 can be positioned for easy removal for servicing the latch assembly 104 and/or the touchless sensor, 138, 140. On certain occasions, it may be necessary to evacuate the user 101, such as a jammed door lock, broken door lock, or seized door. The access panel 156 therefore should positioned and configured to easily removed, for example to avoid having to break the door, use machinery, or emergency landing of an aircraft.

Figure 7:
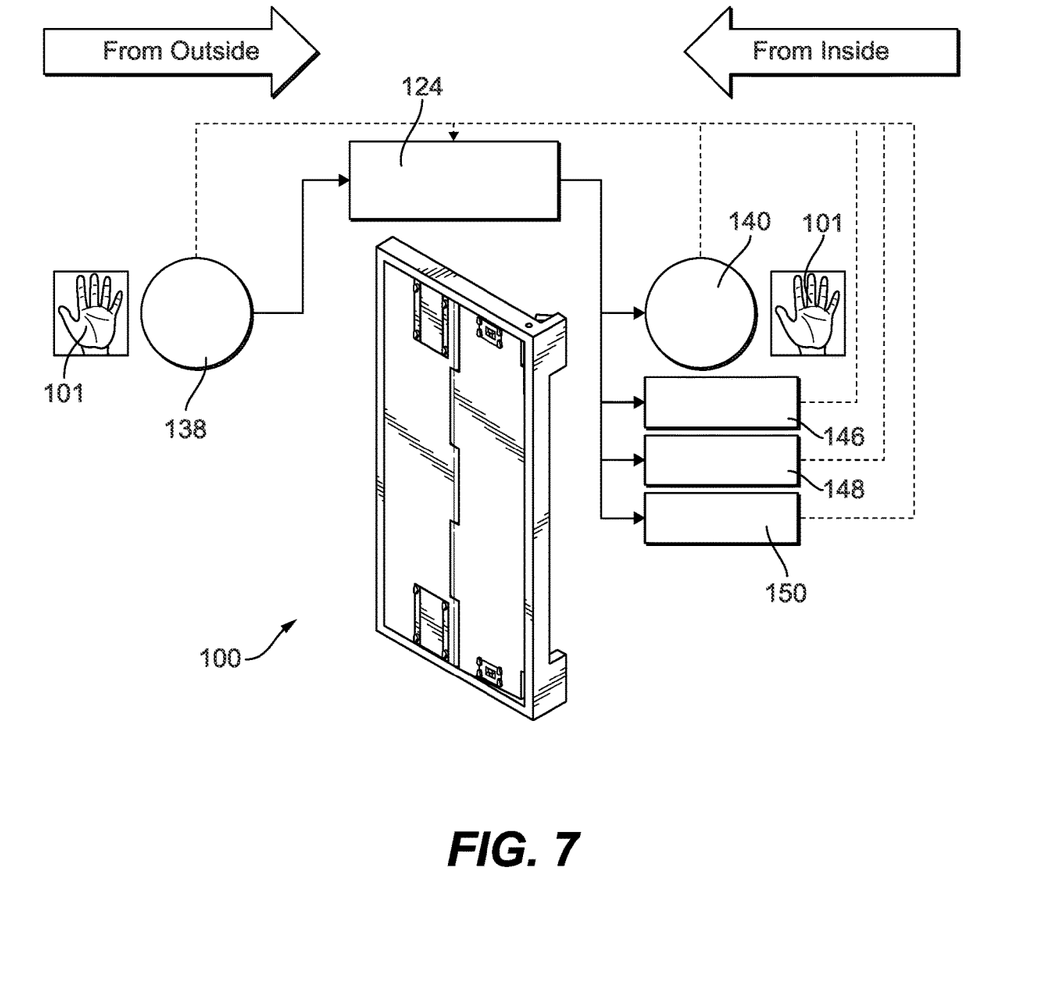
FIG. 7 is a schematic diagram of the door system of FIG. 1 showing a connection of a plurality of components of the door system.
Figure 8:
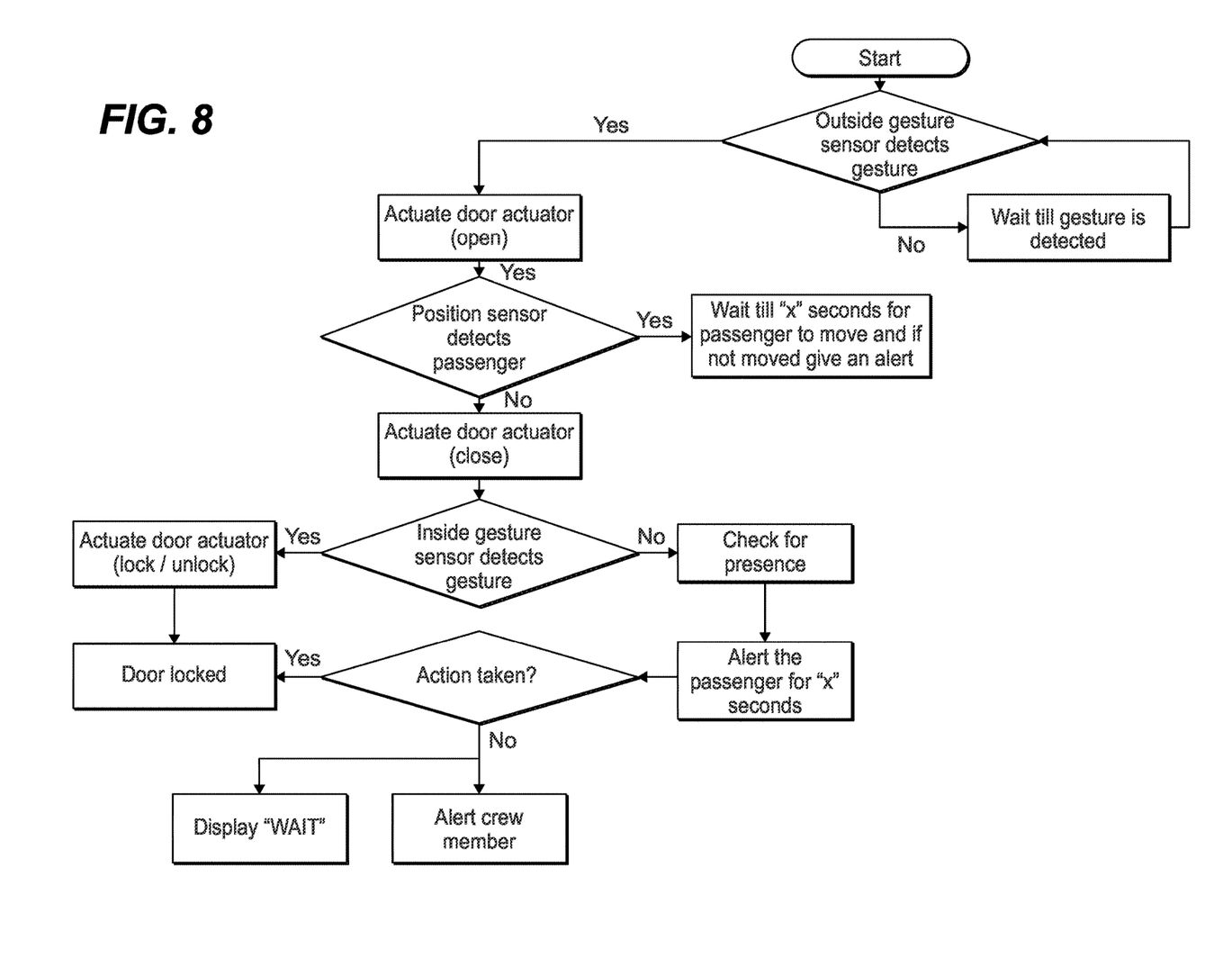
FIG. 8 is a logic diagram showing controller logic of a controller in the door system.
Figure 9:
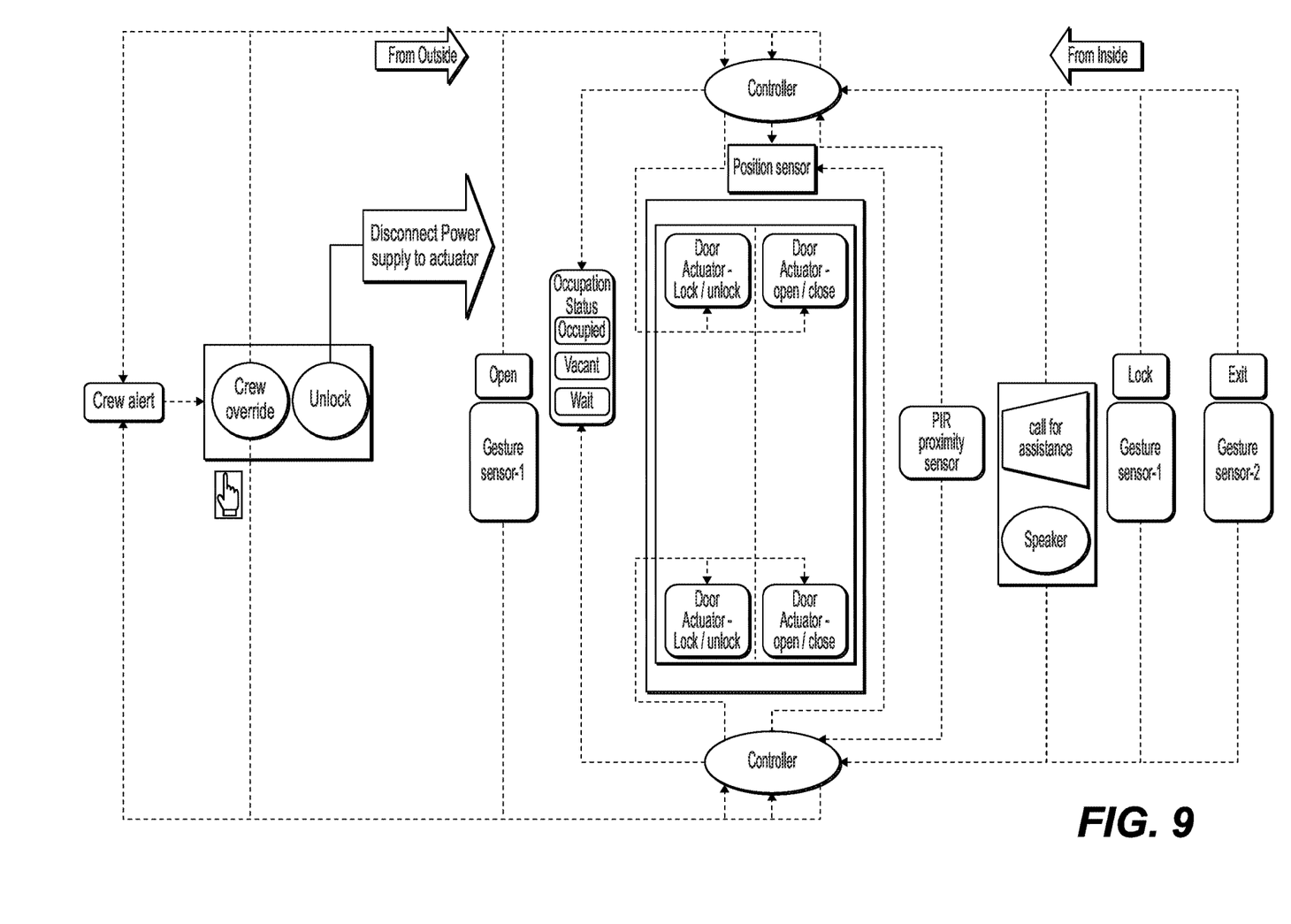
FIG. 9 is a box diagram showing a method in accordance with at least one aspect of the present disclosure.

As shown in FIGS. 7-9, a method comprises receiving input from the touchless sensor 138, 140, actuating the latch actuator 110 operatively connected to the latch assembly 104 to drive the latch assembly 104 to latch and unlatch the door 102 based on the input from the touchless sensor 138, 140, and actuating the extendible door actuator 122 moving the door 120 between an open and closed position.

The method further includes querying if a user 101 is proximate the exterior position sensor 138, and if a user 101 is detected, waiting until the user 101 performs a known gesture. If a known gesture is detected, actuating the latch actuator 110 to unlatch the door 102 and actuating the extendible door actuator 122 moving the door 102 to the open position. However, if no known gesture is detected, waiting until the user 101 performs a known gesture.

In certain embodiments, a position sensor 142 can be disposed in the door frame 114, the method further comprising querying whether the user 101 (or other obstruction 144) is in the door frame 114, if the user 101 is detected in the door frame 114, holding the door 102 in the open position and waiting a threshold period of time before issuing an alert to the user 101, or if no user 101 is detected in the door frame 114, actuating the extendible door actuator moving the door to the closed position.

The method can further include querying if a user 101 is proximate the interior position sensor 140, and if a user 101 is detected, waiting until the user 101 performs a known gesture, if a known close gesture is detected, actuating the extendible door actuator 122 moving the door 102 to the closed position and actuating the latch actuator 110 to latch the doo 102r, or if a known open gesture is detected, actuating the latch actuator 110 to unlatch the door 102 and actuating the extendible door actuator 122 moving the door 102 to the open position, and if the door 102 is latched, displaying on the external display panel 154 a wait signal, or if no known gesture is detected, checking for presence of the user 101, and if after checking for presence of the user 101, no presence is detected, issuing an alert to the user 101 for a threshold amount of time. If the presence sensor 146 detects presence of a user 101, or if a user is otherwise detected on the interior 108 of the door 102, the controller 124 can deactivate the exterior sensor 138, and only receive input from the interior sensor 14, for example to avoid a second user from operating the door 102 while it is latched, despite any warnings on the display panel 154.

In embodiments, the method further includes, if after the threshold amount of time, presence of the user 101 is detected, maintaining the door 102 in the latched position, and taking no further action until a known open gesture is detected, or if after the threshold amount of time, presence of the user 101 is not detected, issuing an alert to a third party (e.g. notification device 152).

Therefore, such systems 100 including the interior sensor 146 and the access panel 156, can provide a failsafe design that allows the door 102 to be opened manually in the event of emergency or in case of door failure. The methods and systems of the present disclosure, as described above and shown in the drawings, provide for improved touch free door systems.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:
1. A lavatory door actuation system comprising:
a controller;
a door including a latch assembly configured to latch the door to a doorframe in a closed position of the door;
a latch actuator operatively connected to the latch assembly to drive the latch assembly to latched and unlatched positions;

an exterior touchless sensor disposed on an exterior of a lavatory and operatively connected to the latch actuator to cause the latch actuator to unlatch the latch assembly upon receipt of touchless input from a user;

at least one doorframe position sensor disposed on the doorframe and operatively connected to the controller configured to sense an obstruction in the doorframe;

at least one interior presence sensor disposed on an interior of the lavatory; and an interior speaker disposed on the interior of the lavatory, wherein the controller includes machine readable instructions configured to cause the controller to perform a method, the method including:

actuating, by the controller, the latch actuator to unlatch the door and actuating an extendible door actuator moving the door to an open position;

holding, by the controller, the door in the open position for a threshold amount of time;

sensing, by the doorframe position sensor, after the threshold amount of time, whether an obstruction is present in the door frame;

in response to sensing no obstruction is present in the door frame, releasing the door from the open position and actuating the extendible door actuator moving the door to the closed position; or in response to sensing the obstruction is present in the door frame, maintaining the door in the open position until the obstruction is no longer present, determining, by the controller, whether the door is in an unlatched position or a latched position;

sensing, by the interior presence sensor, whether an occupant is present in the interior while at least one of the door is in an open position or the door is in the closed position and in the unlatched position; and alerting, by the interior speaker, the occupant to latch the door.

2. The lavatory door actuation system as recited in claim 1, further comprising the doorframe and a set of hinges connecting the door to the door frame allowing the door to move between the closed position and an open position.

3. The lavatory door actuation system as recited in claim 2, further comprising a biasing member connecting the door to the doorframe and biasing the door into the closed position relative to the door frame.

4. The lavatory door actuation system as recited in claim 1, further comprising:

a controller operatively connected to the exterior touchless sensor and to the latch actuator to control the latch actuator based on input from the exterior touchless sensor;

an interior touchless sensor operatively connected to the controller to provide input to the controller based on an occupant inside the door; and machine readable instructions stored in operative communication with the controller to cause the controller to:

actuate the latch actuator to unlatch the door upon receipt of user input to the exterior touchless sensor if the interior presence sensor provides input indicative of no occupant inside the door, and actuate the latch actuator to unlatch the door upon receipt of user input to the interior touchless sensor.

5. The lavatory door actuation system as recited in claim 4, wherein the exterior touchless sensor is disposed on an exterior of the door, adjacent the door frame, wherein the interior touchless sensor is disposed on an interior of the door, adjacent the door frame.

6. The lavatory door actuation system as recited in claim 1, further comprising at least one removable access panel on the door positioned for at least one of: servicing the latch assembly and/or the touchless sensor; and/or for an emergency opening of the door.

7. The lavatory door actuation system as recited in claim 1, wherein the door includes a pair of door panels hingedly connected to one another along a hinge line, wherein at least one door panel includes at least one protrusion configured to seat and slide within a track of the door frame.

8. The lavatory door actuation system as recited in claim 1, further comprising an extendible door actuator operatively connecting between a door panel of the door and the door frame such that actuation of the extendible door actuator moves the door between the open position and the closed position, wherein the extendible door actuator is operatively connected to a controller.

9. The lavatory door actuation system as recited in claim 1, further comprising a display panel operatively connected to a controller, the display panel configured to indicate occupancy status, wherein occupancy status includes at least one of: occupied, vacant, and/or wait.

10. The lavatory door actuation system as recited in claim 4, wherein the machine readable instructions further include instructions configured to cause the controller to:

interpret a gesture by the user when the gesture is performed in view of the touchless sensor; and actuate the latch actuator upon the gesture based on a predetermined action assigned for the gesture.

11. The lavatory door actuation system as recited in claim 1, further comprising an interior microphone disposed on the interior of the lavatory and at least one of an exterior microphone or an exterior speaker disposed on the exterior of the lavatory for communication through the door when the door is in the closed position.

12. The lavatory door actuation system as recited in claim 11, wherein the at least one of the interior microphone or interior speaker are operatively connected to a controller, wherein the controller is configured to actuate the latch actuator upon receipt of user input through at least one of the interior microphone or interior speaker.

13. An aircraft lavatory system comprising:

an aircraft lavatory;

a door including a latch assembly configured to latch the door to a doorframe of the aircraft lavatory in a closed position of the door;

a latch actuator operatively connected to the latch assembly to drive the latch assembly to latched and unlatched positions;

an exterior touchless sensor operatively connected to the latch actuator to cause the latch actuator to unlatch the latch assembly upon receipt of touchless input from a user;

and at least one of an interior microphone or an interior speaker disposed on an interior of the aircraft lavatory and at least one of an exterior microphone or an exterior speaker disposed on an exterior of the aircraft lavatory for communication through the door when the door is in a closed position, wherein the at least one of the interior microphone or the interior speaker are operatively connected to a controller, wherein the controller is configured to actuate the latch actuator upon receipt of user input through the interior microphone or the interior speaker.

* * * * *